April 9, 1963 — B. C. BECKLEY — 3,084,973
MOLDED SHELL TRAILER BODIES
Filed April 25, 1961 — 2 Sheets-Sheet 1
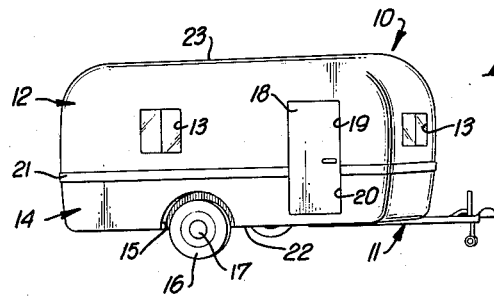
Fig. 1.
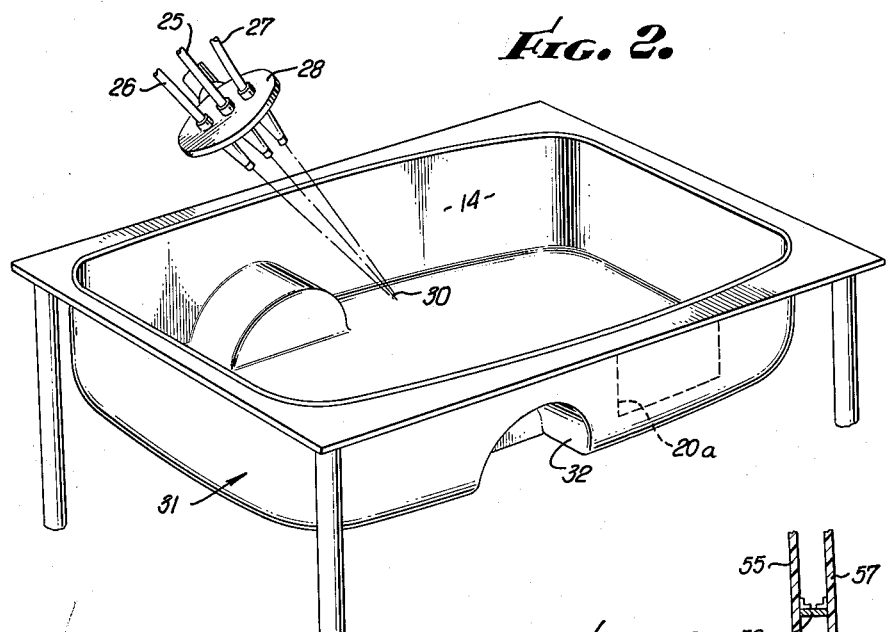
Fig. 2.
Fig. 7.
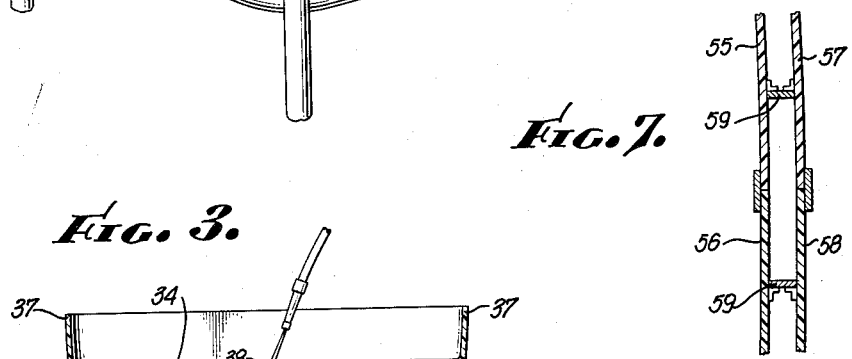
Fig. 3.
INVENTOR.
BENTON C. BECKLEY
BY White and Haefliger
ATTORNEYS.

April 9, 1963     B. C. BECKLEY     3,084,973
MOLDED SHELL TRAILER BODIES
Filed April 25, 1961     2 Sheets-Sheet 2
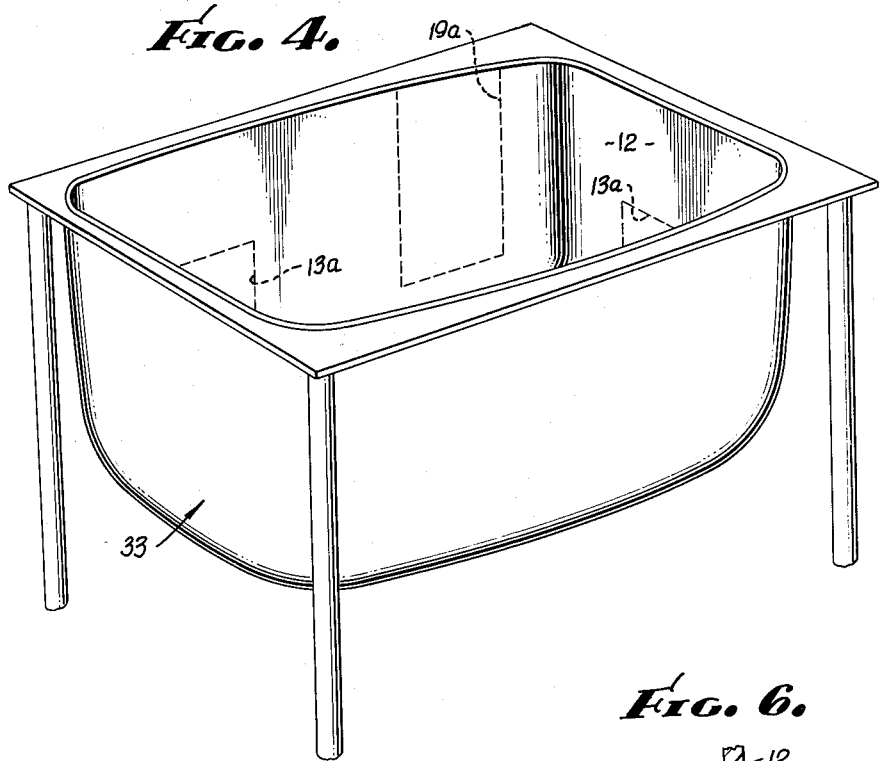
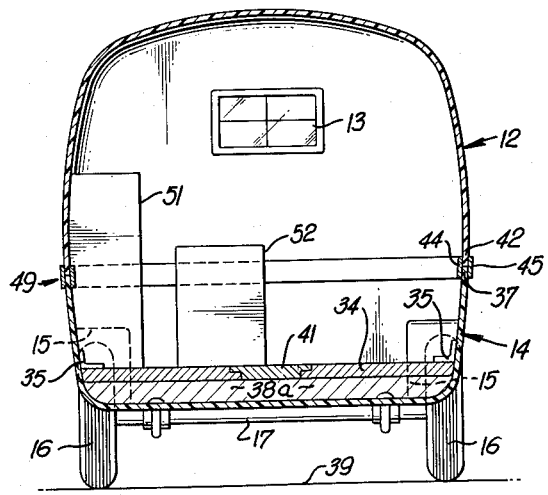
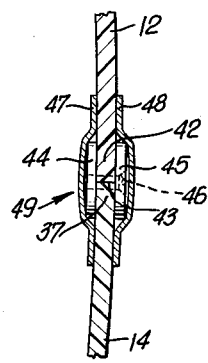
INVENTOR.
BENTON C. BECKLEY
BY
ATTORNEYS.

United States Patent Office 3,084,973
Patented Apr. 9, 1963

3,084,973
MOLDED SHELL TRAILER BODIES
Benton C. Beckley, P.O. Box 1000, 67500 Highway 111,
Palm Springs, Calif.
Filed Apr. 25, 1961, Ser. No. 105,440
4 Claims. (Cl. 296—31)

This invention relates generally to the art of making trailer bodies such as are mounted on wheeled frames to be pulled by automobiles, trucks, and the like, and more particularly has to do with a novel method of fabricating the body shell of a house trailer.

In regard to the design and manufacture of trailer bodies in general, it is found desirable from the standpoint of economy and simplified construction to reduce the number of steps involved in fabricating the body to a minimum, consistent with good workmanship, high strength and reliability in use of the trailer. The cost and the expense of producing trailers is related to the number of body parts required and tooling necessary to make those parts, so that if the trailer design is such as to necessitate relatively few and inexpensive parts and tooling, it becomes possible to manufacture desirably competitive trailers.

The present invention has for its primary purpose to simplify the construction of trailer body shells and at the same time to provide for an extremely simple, high strength, lightweight and inexpensive trailer body construction. As broadly contemplated, the method of fabricating a trailer body includes the steps of molding filler such as glass or other type fibers with binder resins to form one upper body shell section and one lower body section which sections are complementary and have curvature substantially throughout their entire extent, reinforcing and insulating the lower shell section by inserting flooring therein and connecting the flooring thereto, and assembling the sections by bringing together complementary edge portions thereof and interconnecting the latter thereby to form the completed body shell. In addition, other aspects of the invention include the steps of introducing plastic foam settable material into a cavity below the flooring in the lower shell section, thereby to fill the cavity with the material when it becomes set, all for the purpose of adding to the reinforcement and insulation of the lower section. When the body shell sections are brought together in edge abutting relation and are interconnected by securing plate means in overlapping relation to inner and outer facings of the upper and lower edge portions, the completed shell has maximum strength by virtue of the curvature of the sections, the reinforcement of the lower section by flooring and settable plastic foam material, and the firm interconnection of the lower to the upper section which effectively locates the terminal edge of the upper section to the terminal edge of the lower section, this joint being higher than that of the level of the flooring in order to provide a vertical succession of shell rigidizing means including the lowermost settable material, the flooring above the latter, and the joint above the level of the floor. Furthermore, the invention contemplates connection of furniture to both the upper and lower shell sections in spanwise relation to the joint between the sections, thereby to add to the strength of the completed shell.

These and other objects and advantages of the invention, as well as the details of an illustrative embodiment, will be more fully understood from the following detailed description of the drawings, in which:

FIG. 1 is a side elevation showing the completed trailer body on a frame;

FIG. 2 is a perspective showing of the manner in which the lower body shell section is formed in the mold;

FIG. 3 is a vertical section taken through the lower body shell section illustrating the manner in which settable plastic foam material may be filled into the cavity formed directly below flooring therein;

FIG. 4 is a view like FIG. 2 but showing the upper shell section in a mold;

FIG. 5 is a vertical section taken through the completed body shell;

FIG. 6 is a vertical section taken through the joint between the upper and lower sections; and FIG. 7 shows a modified form of shell construction that includes inner and outer shell sections that includes upper and lower inner shell sections, and upper and lower outer shell sections.

Referring first to FIG. 1, the trailer body generally designated at 10 is shown mounted on a wheeled A-frame 11. The body shell includes an upper shell section 12 within which windows 13 are cut, and a lower shell section 14 having wells 15 formed therein for receiving wheels 16 carried by the frame axle 17, the latter being better shown in FIG. 5. FIG. 1 also shows a door 18 mounted within upper and lower openings 19 and 20 cut in the upper and lower shell sections 12 and 14. Finally, a horizontal band 21 extending about the trailer body indicates the location of a joint interconnection of the shell sections, the joint extending generally in a horizontal plane which is closer to the bottom 22 of the trailer body than to the top 23 thereof. It will be observed that both the upper and lower shell sections have exterior convex curvatures throughout their main extent, whereby strength of the assembled shell may be optimized.

Referring to FIGS. 2 and 4, in constructing the molded upper and lower shell sections, a filler such as glass fibers in cloth and/or mat form is blown into the mold as through a gun 25, two other guns 26 and 27 being associated with gun 25 as by a support 28 for jetting catalyst and resin respectively into the mold. The liquid binder resin may comprise any of a number of suitable resins such as one of the synthetic polyester, epoxide, or phenolic resins, containing cure promoting agents, and the catalysts may be any of a number of known catalysts suitable for the resin used. Thus, the gun 27 may blow polyester resins or epoxide in liquid form, whereas the gun 26 may jet cobalt catalyst for mixing with the filler as for example at the point of impingement 30 within the mold. The blown mix is built up to desired thickness as the cluster of guns is moved about, typically to form the lower shell section in the mold 31 in FIG. 2, the same process being carried out in the molding of the upper shell section as seen in FIG. 4. After blowing of the materials into the mold, the thickness of the shell sections may be adjusted by laying a sheet of glass fiber cloth into the mold and over the materials blown therein, and rolling the applied sheet or cloth as by means of a roller, not shown.

The lower body shell section mold 31 may be recessed at 32 to form the shell section with wheel wells 15 at opposite sides of the section. When the shell sections are removed from the molds 31 in FIG. 2 and 33 in FIG. 4, the windows 13 may be cut in the upper shell section as indicated by the broken lines 13–a in FIG. 4, and the door openings 19 and 20 may be cut in the upper and lower shell sections as indicated by the broken lines 20–a in FIG. 2 and 19–a in FIG. 4.

While the lower section 14 remains in the mold 31, or after its removal therefrom prior to assembly with the upper section 12, the reinforcing floor panel made of wood or other similar material is peripherally connected with the inside wall of the section, such insertion of the floor unit downwardly into the lower section being readily accomplished since the section opens upwardly and divergently as seen in FIGS. 3 and 5. Strips of glass fiber cloth 35 impregnated with binder resin may be laid against the opposite upper side of the floor near the edge thereof proximate the section wall, and also against the latter, the resin impregnated strips when cooled firmly connecting the floor and shell section. While the flooring is shown at a low level, it will be understood that the flooring may be located at a higher or lower elevation so long as a cavity 36 is formed directly below the flooring, and so long as the latter is spaced below the level of the edge portion 37 of the lower shell section 14.

For further reinforcement of the shell section 14 prior to or after assembly to the upper shell section, as will be described, settable material is filled into the cavity 36 in an amount sufficient substantially to fill the cavity when set, as indicated in FIGS. 3 and 5, the material being filled having the number 38, and the material when set having the number 38–a. Such material may comprise a light-weight resin such as liquid polyurethane which hardens into foam for heat insulation and stiffening of the lower shell section. Suitable foam plastics are described in the March 1961 issue of the publication "Materials in Design Engineering." Thus the interior of the trailer body may be kept cool by virtue of the filler material 38 interposed between a road surface 39 in FIG. 5 and the flooring 34. Filling of the material 38 into the cavity 36 is facilitated by a hole 40 in the flooring 34, which may be plugged at 41 when the cavity is filled with set or hardened resinous material, suitably small vent holes also being provided.

The upper and lower sections are typically assembled by bringing together complementary edge portions thereof and interconnecting said edge portions which are numbered 37 as respects the lower shell section 14 and 42 as respects the upper shell section. FIG. 6 indicates that the complementary edge portions are brought into edge abutting relation at 43, and are interconnected by securing plates 44 and 45 in overlapping relation to the inner and outer faces of the edge portions 37 and 42. The plates may be secured together by means of a suitable connector 46 extending transversely therethrough and through the joint 43, thereby to keep the edge portions 37 and 42 in vertical alignment, and separation of these edge portions is prevented by tension connectors 47 and 48 at the inner and outer sides of the shell sections. Such tension connectors may comprise resin impregnated glass fiber strips bonded to the shell sections and to the plates, or equivalents thereof, such as metallic strips riveted to the shell sections above and below the plates. In any event, a relatively rigid joint is formed in a horizontal plane spaced above the level of the flooring 34 so that the integral shell which has high strength characteristics by virtue of its curvature, also has additional strength characteristics by virtue of the vertical succession of stiffening settable material 38–a, flooring 34, and the joint interconnection of the upper and lower shell halves, the joint being generally designated at 49. Finally, additional stiffening is given the completed shell by connecting furniture such as is indicated at 51 and 52 in FIG. 5 to both the upper and lower shell sections in overlapping relation to the joint 49. The articles of furniture may be on the flooring 34 prior to the time that the upper shell section is lowered or closed against the lower shell section, or the furniture may be carried through the door opening cut in the completed shell.

For even greater trailer body strength as where the length of the shell is substantially increased, the shell may comprise upper and lower inner shell sections indicated at 55 and 56 in FIG. 7, and upper and lower outer shell sections indicated at 57 and 58, the inner and outer sections being typically interconnected as by struts 59. The air spaces between the sections provides more than adequate insulation against heat dissipation, since the single thickness trailer construction as described above is in itself a highly desirable heat insulator.

I claim:

1. A trailer body assembly, comprising a main upper body shell section and a main lower body shell section each molded from filler and binder resin, said sections being hollow, each of said sections being horizontally forwardly elongated and having curvature throughout substantially the entire shell section extent, said sections being complementary, means interconnecting complementary section edge portions, and flooring extending within the interior of the lower section and peripherally connected to the inner sides of the upright walls of said lower section at locations which are everywhere below the level of said interconnected section edge portions, said lower body shell section being inwardly re-entrant above and below the level of said flooring to form trailer wheel recesses which open outwardly and downwardly at transverse opposite sides of the lower body shell, said flooring and lower section forming a cavity directly below the major extent of the flooring, and extending across the length and width of said lower section, and light-weight rigid resinous material substantially filling said cavity and extending forwardly and rearwardly of said recesses to reinforce said lower section.

2. The invention as defined in claim 1 in which said complementary edge portions extend in abutting relation, said interconnecting means including plates secured in overlapping relation to inner and outer faces of said edge portions.

3. The invention as defined in claim 2 including furniture secured within the body shell to both upper and lower shell sections, the overall vertical dimension of the upper section being substantially in excess of the overall vertical dimension of the lower section.

4. The invention as defined in claim 1 in which the main upper body shell section includes spaced interconnected inner and outer sections, and the main lower body shell section includes spaced interconnected inner and outer sections.

References Cited in the file of this patent

UNITED STATES PATENTS

| | | |
|---|---|---|
| 2,197,950 | Schwenk | Apr. 23, 1940 |
| 2,376,753 | Bowen | May 22, 1945 |
| 2,582,228 | Brinkema | Jan. 15, 1952 |
| 2,612,964 | Hobbs | Oct. 7, 1952 |
| 2,653,139 | Sterling | Sept. 22, 1953 |
| 2,677,571 | Williams | May 4, 1954 |
| 2,883,233 | Beckley | Apr. 21, 1959 |
| 2,909,791 | Mallary | Oct. 27, 1959 |
| 2,950,701 | Stefani | Aug. 30, 1960 |
| 3,007,208 | Urban | Nov. 7, 1961 |

FOREIGN PATENTS

| | | |
|---|---|---|
| 1,158,093 | France | Jan. 13, 1958 |

OTHER REFERENCES

Article: "Low Pressure Lammates," in Automobile Engineer, December 1953, page 549 of 9 pages, 541–549.

Article: "Fleet Built Plastic Bodies," in Commercial Car Journal, February 1954, page 130 of 4 pages, 82, 83, 130 and 131.